E. BRAMAN & R. PETERSON.
BRICK MACHINE.
No. 15,276.
PATENTED JULY 8, 1856.
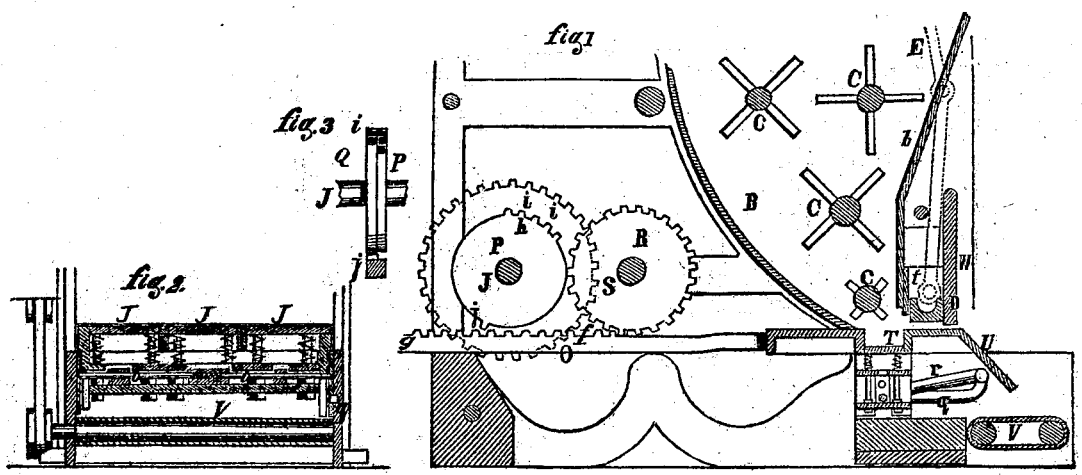

UNITED STATES PATENT OFFICE.

E. BRAMAN AND R. PETERSON, OF GREENCASTLE, INDIANA.

BRICK-MACHINE.

Specification of Letters Patent No. 15,276, dated July 8, 1856.

*To all whom it may concern:*

Be it known that we, E. BRAMAN and R. PETERSON, of Greencastle, in the county of Putnam and State of Indiana, have invented a new and Improved Brick-Machine; and we do hereby declare that the following is a full, clear, and exact description of the same, reference being had to the annexed drawings, making a part of this specification, in which—

Figure 1, is a longitudinal vertical section of our improvement, the plane of section being through the center. Fig. 2, is an end view of the same, the mold and plungers being bisected vertically as indicated by $x$, $x$, Fig. 1. Fig. 3, is a detached end view of two of the part pinions by which the molds are operated.

Similar letters of reference indicate corresponding parts in the several figures.

Our invention consists in the peculiar arrangement of the molds the mode of operating them, the manner of pressing the clay therein, as will be hereinafter fully shown and described.

To enable those skilled in the art to fully understand and construct our invention, we will proceed to describe it.

A represents a rectangular frame constructed in any proper manner to support the working parts.

B, represents the mud hopper which is placed within the frame A. The back plate, $a$, of this hopper is of curved form, as shown in Fig. 1, and the front plate $b$, is bent so that the lower portion is vertical and the upper portion inclined outward. Within the hopper B, there are placed four transverse shafts C, having radial beaters, $c$, attached to them, the lower shaft being at the bottom of the hopper just above its orifice, as shown in Fig. 1.

D, represents a plunger which is formed of a bar placed transversely in the frame A and having its ends passing through slots in the sides of the frame. To each end of the bar or plunger D a toggle E, is attached. The lower ends of these toggles are attached by joints to the plunger and the upper ends are attached by joints to a cross bar F, which is attached to uprights $d$, $d$, on the frame A. Connecting rods, $e$, shown by dotted lines, Fig. 1, are attached to the centers of the toggles, the outer ends of said rods being attached to cranks on the ends of a shaft G, which is placed in the frame A. The shaft G, has a toothed wheel H, on one end which wheel gears into a wheel I on the end of a shaft J, which is the driving shaft of the machine. The wheel H, gears into a corresponding wheel K which is placed on one end of a shaft L, the wheel K, gearing into a wheel M, on one of the mud mill shafts C, to which motion is communicated by gear wheels N, N.

O′, represents a horizontal bar which has teeth $f$, $g$, cut on its upper end. The teeth $g$, are not as long or as wide as the teeth $f$. Two wheels P, Q, are placed on the shaft J. These wheels are placed side by side and one wheel, P, has a portion of its periphery toothed, as shown at $h$, and the other wheel Q, has three teeth, $i$, on its periphery and also a tooth $j$, the tooth $j$, being opposite or nearly so to the teeth $i$.

R, represents a toothed wheel which is placed on a shaft S. This wheel gears into the teeth $f$, on the bar O′, and the teetth $h$, on the wheel P, gear into the wheel R, as said wheel rotates.

To the front end of the bar O, a mold box T is attached. This box is merely an oblong trough divided by partition plates $k$, as shown in Fig. 2. This mold box has no bottom but each space between the partition plates is provided with a plunger $l$. These plungers are attached to vertical rods $m$, which pass through two parallel plates $n$, $n$, the ends of which are attached to the end pieces of the mold box T; the ends of the mold box projecting downward sufficiently far for this purpose. Between the two plates $n$, $n$, there are placed two rods $o$, $o$, which are in line with each other, and have a spring $p$, placed between them. The outer ends of the rods, $o$, pass through the ends of the mold box T, and fit in grooves $q$, which are made in the inner sides of the frame A. The inner parts of these grooves are made horizontal, but the outer parts are curved upward, as clearly shown in Fig. 1, and a shallow groove $r$, connects the outer curved end of each groove $q$ with its back end. The spring $p$, keeps the ends of the rods $o$ in the grooves. To the upper and outer ends of the mold box T, an inclined plate U is attached and an endless apron V is placed in the lower part of the frame A, a short distance below the inclined plate U. The rods $m$, $m$, have spiral springs $s$, placed on them and the lower ends of the rods are attached to the lower plate $n$.

The operation is as follows: By turning the shaft J, motion is communicated to all the working parts. The clay, properly moistened is placed within the hopper B, and the beaters c, as they rotate, mix and temper the clay, the lower beaters or those on the lower shaft fill the mold box T, when underneath the hopper B, when the box T is filled, the tooth j, on the wheel Q, will come in contact with the teeth g on the bar O, and the mold box will be moved forward below the front plate b, of the hopper and underneath the plunger D, which is raised at this time. When the mold box is underneath the plunger the tooth j, on the wheel Q, leaves the teeth g, on the bar O, and the mold box is at rest while the plunger D is forced down, by the toggles E, upon the mold box, the plunger compressing the clay therein.

The springs s, keep the plungers l, at the bottom of the mold box T, when it is underneath the hopper and plunger D and a sliding or adjustable plate t, is attached to the lower part of the front plate of the hopper B by which plate the requisite amount of clay is fed to the mold box, or allowed to be compressed therein.

When the clay is compressed in the mold box by the descent of the plunger D, the plunger is raised by the toggles E, and the three teeth i', on the wheel Q, then fall in gear with the teeth g, and move the mold box outward from underneath the plunger D and a vertical plate W, is placed in front of the plunger when the mold box passes out from underneath the plunger D and plate W, the springs s, will throw the plungers l, in the mold box T, upward, as the curved ends of the slots Q will allow the rods o, o, to rise and the pressed clay will be raised on a level with the upper surface of the mold box. The teeth h, on the wheel now fall in gear with the wheel R and the bar O', and mold box are moved back to their original position, the pressed clay passing down the inclined plate U, upon the apron V, which delivers it at the extreme end of the frame A. As the mold box T, moves backward, the ends of the rods o, o, pass along the shallow grooves r, into the inner ends of the grooves q.

Having thus described our invention, what we claim as new and desire to secure by Letters Patent, is—

1. The mold box T, provided with the plungers l, when said plungers are operated by the springs, s, and rods o, o, working in the grooves q, r, for the purpose of allowing the mold box to receive the clay, and also to eject the compressed clay therefrom, when the above parts are constructed, arranged, and operated as described.

2. We claim operating the mold box T, when constructed and arranged as above set forth or giving it a reciprocating motion with the necessary "dwells" to allow the box to be filled with clay and also to allow the clay to be pressed therein, by means of the rack bar O', and wheels R, P, Q, when arranged and operating as shown and described.

3. We claim the combination of the plunger D, rods (o), (o), working in grooves (y), (r), with the mold box T, provided with the plungers l, when the above parts are arranged and operated relatively with each other as shown for the purpose specified.

E. BRAMAN.
R. PETERSON.

Witnesses:
WILLIAM LEE.
J. McD. HAYS.